United States Patent
Miyabe et al.

(10) Patent No.: US 9,156,723 B2
(45) Date of Patent: Oct. 13, 2015

(54) GLASS SUBSTRATE

(75) Inventors: Daisuke Miyabe, Tokyo (JP); Hiromitsu Seto, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 316 days.

(21) Appl. No.: 13/390,027

(22) PCT Filed: Jul. 29, 2010

(86) PCT No.: PCT/JP2010/004810
§ 371 (c)(1),
(2), (4) Date: Feb. 10, 2012

(87) PCT Pub. No.: WO2011/018883
PCT Pub. Date: Feb. 17, 2011

(65) Prior Publication Data
US 2012/0141804 A1 Jun. 7, 2012

(30) Foreign Application Priority Data
Aug. 14, 2009 (JP) .................. 2009-188011

(51) Int. Cl.
C03C 3/087 (2006.01)
C03C 17/23 (2006.01)

(52) U.S. Cl.
CPC ............ *C03C 3/087* (2013.01); *C03C 17/23* (2013.01); *C03C 2217/211* (2013.01); *C03C 2217/231* (2013.01); *C03C 2217/241* (2013.01); *C03C 2217/244* (2013.01)

(58) Field of Classification Search
None
See application file for complete search history.

(56) References Cited

U.S. PATENT DOCUMENTS 3,927,238 A * 12/1975 DiMarcello ............... 428/336
5,116,789 A * 5/1992 Dumbaugh et al. ......... 501/66
(Continued)

FOREIGN PATENT DOCUMENTS

JP 8-109037 4/1996
JP 11-135819 5/1999
(Continued)

OTHER PUBLICATIONS

Callister, Fundamentals of Materials Science and Engineering: An Integrated Approach, 4th Edition, p. 616, May 2012.*

*Primary Examiner* — David Sample
(74) *Attorney, Agent, or Firm* — Hamre, Schumann, Mueller & Larson, P.C.

(57) ABSTRACT

The glass substrate of the present invention includes, in terms of mass %: 58.5-69.5% $SiO_2$, 2.5-9.9% $Al_2O_3$, 0-2.5% $Li_2O$, 0%≤$Na_2O$<6%, 0%≤$K_2O$<6%, 0%<MgO≤5.2%, 3%<CaO≤13%, 10-27% SrO, 0%≤BaO<5%, 0-3% $TiO_2$, and 0-9.8% $ZrO_2$. $SiO_2+Al_2O_3$≤73%, $Li_2O+Na_2O+K_2O$<6%, 3%<MgO+CaO≤16%, SrO+BaO 10-27%, MgO+CaO+SrO+BaO 21-33%, and MgO/CaO 0.2-1.0 in molar fraction. The glass substrate is substantially free from $B_2O_3$. Glass transition point >555° C., liquidus temperature ≤1200° C., and average thermal expansion coefficient ≤75×10$^{-7}$/° C. The present invention can provide a glass substrate having a thermal expansion coefficient close to those of a semi conductor film, etc. and a high strain point, and suitable for continuous production by a float process.

10 Claims, 2 Drawing Sheets

(56) References Cited

U.S. PATENT DOCUMENTS

| | | | |
|---|---|---|---|
| 5,489,558 A * | 2/1996 | Moffatt et al. | 501/69 |
| 5,508,237 A * | 4/1996 | Moffatt et al. | 501/69 |
| 6,333,286 B1 | 12/2001 | Kurachi et al. | |
| 2002/0010066 A1 * | 1/2002 | Nakashima et al. | 501/69 |
| 2002/0147102 A1 * | 10/2002 | Yamazaki et al. | 501/70 |
| 2003/0087746 A1 | 5/2003 | Ritter et al. | |
| 2008/0128923 A1 * | 6/2008 | Saito et al. | 257/794 |
| 2009/0137379 A1 * | 5/2009 | Nagai et al. | 501/70 |
| 2009/0191350 A1 * | 7/2009 | Goto et al. | 427/421.1 |

FOREIGN PATENT DOCUMENTS

| | | |
|---|---|---|
| JP | 2000-143282 | 5/2000 |
| JP | 2002-193635 | 7/2002 |
| JP | 2003-525830 | 9/2003 |
| JP | 2004-277222 | 10/2004 |
| JP | 2007-308329 | 11/2007 |
| JP | 2008-280189 | 11/2008 |

* cited by examiner

GLASS SUBSTRATE

TECHNICAL FIELD

The present invention relates to a glass substrate suitable to be used as a substrate for a solar cell, a field emission display (FED), a plasma display panel (PDP) and the like. Particularly, the present invention relates to a glass substrate suitable for a solar cell including a compound semiconductor such as a CdTe thin film and a CIGS thin film.

BACKGROUND ART

The solar cell including a compound semiconductor such as a CdTe thin film and a CIGS thin film is growing in demand as an environmentally-friendly energy source. Conventionally, inexpensive soda lime glass produced by a float process has been used for the glass substrate of the solar cell. As shown in FIG. 1, in a CdTe solar cell, semiconductor thin films such as a CdS thin film 3 and a CdTe thin film 4 are formed on a glass substrate 10 with a transparent conductive film, and a metal conductive film 5 and electrodes 6 further are formed thereon. The glass substrate 10 with a transparent conductive film includes a glass substrate 1 and a transparent conductive film 2 formed on the glass substrate 1. In a CIGS solar cell, a Mo thin film for an electrode is formed on a glass substrate, and a CIGS semiconductor, an n-type semiconductor (a ZnO:Al film, for example), etc. are formed thereon.

In the processes of producing these thin film compound semiconductor solar cells, a high temperature treatment is needed. For example, a close space sublimation method is used for forming a CdTe thin film, and the temperature of the substrate may reach around 600° C. in this case. Moreover, it is possible to increase the efficiency of the semiconductor by applying a $CdCl_2$ treatment at 620° C. to the formed thin film. In the case of a CIGS solar cell, the glass substrate is exposed to a high temperature of 500 to 600° C. in the step of forming a semi conductor film (a p-type optical absorption layer). In the both cases, a high temperature treatment at 500° C. or higher can enhance the photoelectric conversion efficiency of a thin film compound semiconductor solar cell.

However, since the conventionally-used soda lime glass has a strain point of around 500° C., a substrate made of soda lime glass is deformed at a temperature equal to or higher than that. Thus, when the soda lime glass is used for the substrate, the temperature of the substrate can be raised only to around 500° C. at highest in the high temperature treatments, causing a problem that the semiconductor does not exhibit the photoelectric conversion efficiency that it has intrinsically.

The CdTe semiconductor and the Mo electrode have a thermal expansion coefficient of about $50 \times 10^{-7}/°$ C., whereas the soda lime glass has a thermal expansion coefficient of about $90 \times 10^{-7}/°$ C. When, on a glass substrate made of soda lime glass, a thin film having a thermal expansion coefficient largely different from that of this substrate is formed at a high temperature of 500° C. or more, a high remaining stress is generated between the glass substrate and the thin film after they are cooled. In the process of producing a solar cell, conditions, such as the treatment temperature and cooling rate for the substrate, are selected so as not to cause problems due to the remaining stress. Thus, in the case where the thermal expansion coefficient of the substrate and that of the thin film are close to each other, the remaining stress can be reduced and the range of the selectable treatment conditions is widened. As a result, this allows for further improvement on the photoelectric conversion efficiency.

In this circumstance, there is needed a glass substrate for a solar cell that has a higher heat resistance (specifically, a strain point of 500° C. or higher), a smaller thermal expansion coefficient (specifically, an average thermal expansion coefficient of $75 \times 10^{-7}/°$ C. or less in a temperature range of 50 to 350° C.) and a large area, and is inexpensive, as compared to the soda lime glass substrate.

In recent years, solar panels have become larger in area, but it is preferable for them to be as light in weight as possible from the viewpoint of handling. For this purpose, it is desirable that the glass substrate for a solar cell has a smallest possible density.

Examples of the method for producing glass sheets with a large area include a down-draw process, a fusion process and a float process. The float process is superior to the other glass sheet production methods in that the float process makes it possible to mass-produce the glass sheets with a large area at lower cost. Moreover, glass sheet production apparatuses adopting the float process are widely used in the world to produce glass sheets for building materials. Thus, glass substrates that can be mass-produced by the existing float-process production apparatuses have an advantage that they can be supplied to a wide area.

The working temperature (the temperature suitable for forming glass sheets, and in the float process, it is the temperature at which the glass has a viscosity of $10^4 dPa \cdot s$) of the soda lime glass is about 1000° C. In the float-process production apparatuses widely used to produce glass sheets for building materials, the heat and the erosion by the molten glass deteriorate more severely the bricks at the entrance of a tin bath as the working temperature of the glass is higher, exceeding 1000° C. Moreover, in the production by the float process, the glass needs to have a liquidus temperature lower than its working temperature. Taking into consideration that the working temperature should not far exceed 1000° C., the liquidus temperature of glass to be mass-produced by the float-process production apparatus preferably is 1200° C. or lower.

Patent Literature 1 discloses a glass composition having a higher strain point than that of conventional soda lime glass and a thermal expansion coefficient of about $50 \times 10^{-7}/°$ C. However, this glass composition contains 1 to 8 mass % of $B_2O_3$ and a large amount of the $B_2O_3$ is volatilized when the glass is melted, eroding severely the bricks used in a regenerator with a melting furnace. Accordingly, the melting furnace is deteriorated severely, causing a problem of higher cost.

Also, Patent Literature 2 discloses a glass substrate having an annealing point of 550° C. or higher as a glass substrate for a CIGS solar cell. However, this glass substrate contains 7% or more of an alkali metal oxide in total, and thus it is difficult, in reality, for the glass substrate to have an average thermal expansion coefficient of $75 \times 10^{-7}/°$ C. or less in the temperature range of 50 to 350° C.

On the other hand, glass substrates for a field emission display (FED), a plasma display panel (PDP) and the like also are required to have a high strain point. Patent Literature 3 discloses a glass substrate having a strain point of 590° C. or higher as such a substrate for a flat panel display. However, the glass composition disclosed in Patent Literature 3 contains a large amount of SrO and further needs a large amount of BaO (5 to 12.5% of SrO and 9 to 14% of BaO, according to claim 2). This increases excessively the density of the glass substrate (to 2.83 g/cm³ or more).

CITATION LIST

Patent Literature

PTL 1: JP 2003-525830 T
PTL 2: JP 11(1999)-135819A
PTL 3: JP 2007-308329 A

SUMMARY OF INVENTION

Technical Problem

The present invention is intended to provide a glass substrate that has a suppressed deformation even when it is subject to a heat treatment at 500° C. or higher, has an average thermal expansion coefficient of $75 \times 10^{-7}$/° C. or less in a temperature range of 50 to 350° C., and has a liquidus temperature and a glass composition that are suitable for a continuous production by the float process.

Solution to Problem

The present invention proposes a glass substrate including, in terms of mass %: 58.5 to 69.5% of $SiO_2$, 2.5 to 9.9% of $Al_2O_3$, 0 to 2.5% of $Li_2O$, 0% or more but less than 6% of $Na_2O$, 0% or more but less than 6% of $K_2O$, more than 0% but 5.2% or less of MgO, more than 3% but 13% or less of CaO, 10 to 27% of SrO, 0% or more but less than 5% of BaO, 0 to 3% of $TiO_2$, and 0 to 9.8% of $ZrO_2$. A value of $SiO_2+Al_2O_3$ is 73% or less. A value of $Li_2O+Na_2O+K_2O$ is less than 6%. A value of MgO+CaO is more than 3% but 16% or less. A value of SrO+BaO is 10 to 27%. A value of MgO+CaO+SrO+BaO is 21 to 33%. A value of MgO/CaO is 0.2 or more but 1.0 or less in molar fraction. The glass substrate is substantially free from $B_2O_3$. The glass substrate has a glass transition point higher than 555° C. The glass substrate has a liquidus temperature of 1200° C. or lower. The glass substrate has an average thermal expansion coefficient of $75 \times 10^{-7}$/° C. or less in a temperature range of 50 to 350° C. In the present invention, the phrase "to be substantially free from a component" indicates that the content of the component ($B_2O_3$, for example) is, in terms of in mass %, less than 0.5%, preferably less than 0.1%.

Advantageous Effects of Invention

The glass substrate according to the present invention has a strain point about 55° C. lower than its glass transition point at least when the glass substrate has a glass composition within the above-mentioned ranges. Thus, the strain point exceeds 500° C. when the glass transition point exceeds 555° C. Therefore, use of the glass substrate according to the present invention can raise the highest heat treatment temperature in the solar cell production process to 500° C. or higher and enhance further the photoelectric conversion efficiency of the solar cell. Moreover, since the average thermal expansion coefficient of the glass substrate according to the present invention is $75 \times 10^{-7}$/° C. or less, the remaining stress between the substrate and the thin film can be reduced. In addition, since the glass substrate according to the present invention has a liquidus temperature of 1200° C. or lower and is substantially free from $B_2O_3$, it is possible to reduce the load to the bricks in the melting furnace in the production of the glass substrate by a float process. Furthermore, the glass substrate according to the present invention is suitable for achieving a relatively small density because it has a small content of BaO.

DESCRIPTION OF EMBODIMENTS

Figure 1:
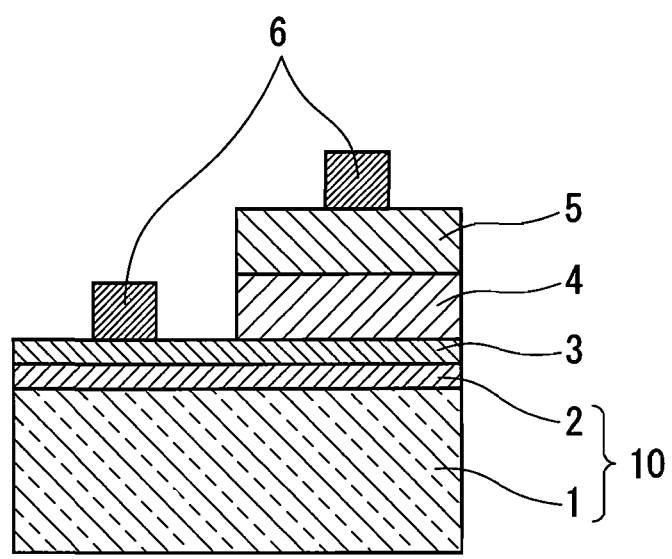
FIG. 1 is a cross-sectional view for illustrating the structure of a CdTe solar cell.

The contents of the composition components in the glass are limited in the present invention for the following reason. Hereinafter, the contents of the composition components in the glass are expressed in terms of mass % unless otherwise noted.

$SiO_2$ is a network former in the glass. The content of $SiO_2$ is 58.5 to 69.5%, preferably more than 59% but 66% or less, more preferably more than 59% but 63% or less, and further preferably more than 59% but 62% or less. A content of $SiO_2$ less than 58.5% lowers the strain point of the glass. A content of $SiO_2$ more than 69.5% may lower excessively the thermal expansion coefficient and make it difficult to melt and form the glass.

$Al_2O_3$ raises the strain point and lowers the liquidus temperature of the glass. The content of $Al_2O_3$ *is* 2.5 to 9.9%, preferably 4.8 to 9.9%, and more preferably 7 to 8%. A content of $Al_2O_3$ more than 9.9% raises the liquidus temperature and increases the high temperature viscosity of the glass, and tends to lower the meltability of the glass. A content of $Al_2O_3$ less than 2.5% raises the liquidus temperature.

Although not an essential component, $Li_2O$ enhances the meltability and lowers the high temperature viscosity and the liquidus temperature. The content of $Li_2O$ is 0 to 2.5%, and preferably 0% or more but less than 1%. The glass substrate according to the present invention may have a composition that is substantially free from $Li_2O$. A content of $Li_2O$ more than 2.5% lowers the strain point and increases the thermal expansion coefficient.

$Na_2O$ enhances the meltability and lowers the high temperature viscosity and the liquidus temperature. The content of $Na_2O$ is 0% or more but less than 6%, preferably 0% or more but less than 5%, and more preferably 3% or more but less than 5%. A content of $Na_2O$ of 6% or more lowers the strain point and increases the thermal expansion coefficient.

Although not an essential component, $K_2O$ enhances the meltability and lowers the high temperature viscosity and the liquidus temperature. $K_2O$ is more effective in increasing the thermal expansion coefficient than $Na_2O$. The content of $K_2O$ is 0% or more but less than 6%, and preferably 0% or more but less than 2%. The glass substrate according to the present invention may have a composition that is substantially free from $K_2O$. A content of $K_2O$ of 6% or more lowers the strain point and increases the thermal expansion coefficient.

MgO enhances the meltability and raises the strain point. The content of MgO is more than 0% but 5.2% or less, preferably 2 to 5.2%, and more preferably 2 to 4%. A content of MgO more than 5.2% raises the liquidus temperature.

Like MgO, CaO enhances the meltability and raises the strain point. The content of CaO is more than 3% but 13% or less, preferably 4 to 8%, and more preferably 4 to 7%. A content of CaO of 3% or less makes it impossible to achieve sufficiently the above-mentioned effects. A content of CaO more than 13% raises the liquidus temperature.

SrO reduces the high temperature viscosity without raising the liquidus temperature. The content of SrO is 10 to 27%, preferably 13 to 27%, more preferably more than 15% but 18% or less, and further preferably 15.5 to 18%. A content of SrO more than 27% or less than 10% raises the liquidus temperature. To decrease the density, the content of SrO preferably is 17.5% or less, more preferably 16.5% or less.

Although not an essential component, BaO reduces the high temperature viscosity without raising the liquidus temperature. The content of BaO is 0% or more but less than 5%, preferably 0% or more but less than 3%, and more preferably 0% or more but less than 2%. The glass substrate according to the present invention may have a composition that is substantially free from BaO. A content of BaO of 5% or more increases the density excessively.

Although not an essential component, $TiO_2$ lowers slightly the devitrification temperature. The content of $TiO_2$ is 0 to 3%, preferably 0 to 2%, and more preferably 0 to 1%. Further preferably, the glass substrate is free from $TiO_2$. A content of $TiO_2$ more than 3% causes the glass substrate to absorb an increased amount of light in the ultraviolet region of a sunlight spectrum $ZrO_2$ lowers the liquidus temperature and reduces the thermal expansion coefficient. The content of $ZrO_2$ is 0 to 9.8%, preferably 0.1 to 5%, more preferably 2 to 4%, and further preferably 3 to 4%. A content of $ZrO_2$ more than 9.8% raises the liquidus temperature.

The value of $SiO_2+Al_2O_3$ is 73% or less, and preferably 72% or less. A value of $SiO_2+Al_2O_3$ exceeding 73% raises the liquidus temperature.

The value of $Li_2O+Na_2O+K_2O$ is less than 6%, and preferably less than 5%. A value of $Li_2O+Na_2O+K_2O$ of 6% or more increases the thermal expansion coefficient.

The value of MgO+CaO is more than 3% bit 16% or less, preferably 6 to 13%, and more preferably 6 to 11%. A value of MgO+CaO exceeding 16% raises the liquidus temperature. A value of MgO+CaO of 3% or less lowers the meltability of the glass.

The value of SrO+BaO is 10 to 27%, preferably 10 to 25%, more preferably 10 to 23%, and further preferably more than 15% but 18% or less. A value of SrO+BaO exceeding 27% increases excessively the density of the glass. A value of SrO+BaO less than 10% raises the devitrification temperature.

The value of MgO+CaO+SrO+BaO is 21 to 33%, and preferably 21 to 25%. A value of MgO+CaO+SrO+BaO exceeding 33% increases the density and the thermal expansion coefficient of the glass and raises the liquidus temperature. A value of MgO+CaO+SrO+BaO less than 21% lowers the meltability and raises the liquidus temperature.

The value of MgO/CaO in molar fraction is 0.2 or more but 1.0 or less, and preferably 0.3 or more but 0.8 or less. A value of MgO/CaO in molar fraction exceeding 1.0 or less than 0.2 raises the liquidus temperature and makes it difficult to form the glass.

Although the glass composition may be composed only of the components mentioned above, it may further contain at least one component selected from: another inorganic oxide such as $Fe_2O_3$, $CeO_2$, $Bi_2O_3$, ZnO, SnO, $Sb_2O_3$, $Nb_2O_5$, $La_2O_3$, $Y_2O_3$, $As_2O_3$ and PbO; a sulfur oxide such as $SO_3$; a chloride; a nitride; and a fluoride, in, at maximum, a content of 5%, preferably 1%, and more preferably 0.1%, per component.

As an example of the preferable glass composition of the present invention, there can be mentioned a composition, as the composition for which the contents are limited above, containing 4.8 to 9.9% of $Al_2O_3$, 0% or more but less than 5% of $Na_2O$, 0% or more but less than 2% of $K_2O$, and more than 15% but 18% or less of SrO, in which the value of $Li_2O+Na_2O+K_2O$ is less than 5%.

Although the glass substrate according to the present invention can be produced by various methods such as a down draw process and a fusion process, it is preferable that the glass substrate is produced by a float process from the viewpoint of producing continuously the glass substrate with a large area at low cost. The glass substrate according to the present invention has a glass composition and characteristics suitable for the production by a float process. That is, the present invention provides, in another aspect, a method for producing a glass substrate according to the present invention, including: melting a raw material; and forming the material into the glass substrate. The melting step and the forming step are conducted by a float process.

The glass substrate according to the present invention can be used as a glass substrate for forming a transparent conductive film thereon to provide a glass substrate with a transparent conductive film. As the transparent conductive film, there can be used a film, such as an $SnO_2$ film doped with fluorine, antimony or the like and an ITO film.

EXAMPLES

Hereinafter, the present invention is described in more detail with reference to Examples and Comparative Examples. The present invention is not limited to these Examples.

The raw materials of the respective components were mixed so as to obtain the glass compositions (mass %) shown in Table 1. Here, salt cake was used as a part of the source material of $Na_2O$. Special grade reagent chemicals were used as the source materials of the respective components. Each mixture obtained by mixing the source materials was fed into a crucible and melted at 1550° C. for 4 hours, and then poured from the crucible to be annealed. Thus, glass samples (glass substrates) were obtained.

TABLE 1

| | Examples | | | | | | | | |
|---|---|---|---|---|---|---|---|---|---|
| No. | 1 | 2 | 3 | 4 | 5 | 6 | 7 | 8 | 9 |
| $SiO_2$ | 60.2 | 59.7 | 65 | 59.7 | 61.2 | 58.7 | 60.8 | 59.9 | 59.4 |
| $Al_2O_3$ | 7.6 | 7.5 | 8 | 7.8 | 7.8 | 7.4 | 7.7 | 7.6 | 7.5 |
| $Li_2O$ | 0 | 0 | 0 | 0 | 0 | 0 | 0 | 0 | 0 |
| $Na_2O$ | 4.8 | 4.8 | 5 | 4.9 | 4.8 | 4.7 | 4.9 | 4.8 | 4.8 |
| $K_2O$ | 0 | 0 | 0 | 0 | 0 | 0 | 0 | 0 | 0 |
| MgO | 2.5 | 2.2 | 3.3 | 3.2 | 3 | 1.7 | 1.5 | 1.2 | 1.1 |
| CaO | 5.2 | 4.6 | 7.7 | 7.5 | 6.3 | 3.6 | 8.4 | 6.9 | 6.2 |
| SrO | 16 | 17.5 | 11 | 10.7 | 13 | 20.3 | 12.9 | 15.9 | 17.4 |
| BaO | 0 | 0 | 0 | 0 | 0 | 0 | 0 | 0 | 0 |
| $TiO_2$ | 0 | 0 | 0 | 2.4 | 0 | 0 | 0 | 0 | 0 |
| $ZrO_2$ | 3.7 | 3.6 | 0 | 3.8 | 3.7 | 3.6 | 3.7 | 3.7 | 3.6 |
| RO | 23.7 | 24.3 | 22 | 21.4 | 22.4 | 25.6 | 22.9 | 24.1 | 24.7 |

TABLE 1-continued

| | | | | | | | | | |
|---|---|---|---|---|---|---|---|---|---|
| MgO/CaO (Molar fraction) | 0.67 | 0.67 | 0.6 | 0.6 | 0.67 | 0.67 | 0.25 | 0.25 | 0.25 |
| Liquidus temperature (° C.) | 1069 | 1087 | 1161 | 1142 | 1134 | 1129 | 1143 | 1136 | 1151 |
| Average thermal expansion coefficient ($\times 10^{-7}$/° C.) | 67 | 68 | 67 | 65 | 65 | 70 | 63 | 70 | 70 |
| Tg (° C.) | 684 | 675 | 665 | 689 | 682 | 670 | 681 | 685 | 677 |
| Strain point (° C.) | 629 | (620) | (610) | (634) | (627) | (615) | (626) | (630) | (622) |
| Density (g/cm³) | 2.79 | 2.81 | 2.65 | 2.71 | 2.74 | 2.86 | 2.76 | 2.80 | 2.82 |

| | Examples | | | | | Comparative Examples | | | |
|---|---|---|---|---|---|---|---|---|---|
| No. | 10 | 11 | 12 | 13 | 14 | 15 | 16 | 17 | 18 |
| SiO₂ | 58.5 | 63.8 | 62.8 | 62.2 | 61.2 | 65 | 65 | 65 | 59.6 |
| Al₂O₃ | 7.4 | 4.7 | 4.6 | 4.6 | 4.5 | 8 | 8 | 8 | 7.8 |
| Li₂O | 0 | 0 | 0 | 0 | 0 | 0 | 0 | 0 | 0 |
| Na₂O | 4.7 | 5 | 4.9 | 4.8 | 4.8 | 5 | 5 | 5 | 4.9 |
| K₂O | 0 | 0 | 0 | 0 | 0 | 0 | 0 | 0 | 0 |
| MgO | 0.8 | 3.1 | 2.5 | 2.3 | 1.7 | 4.4 | 13.2 | 7.7 | 7.5 |
| CaO | 4.7 | 6.4 | 5.3 | 4.7 | 3.6 | 13.2 | 4.4 | 3.3 | 3.2 |
| SrO | 20.2 | 13.2 | 16.2 | 17.7 | 20.6 | 4.4 | 4.4 | 11 | 10.7 |
| BaO | 0 | 0 | 0 | 0 | 0 | 0 | 0 | 0 | 0 |
| TiO₂ | 0 | 0 | 0 | 0 | 0 | 0 | 0 | 0 | 2.5 |
| ZrO₂ | 3.6 | 3.8 | 3.7 | 3.7 | 3.6 | 0 | 0 | 0 | 3.8 |
| RO | 25.8 | 22.7 | 24 | 24.6 | 25.9 | 22 | 22 | 22 | 21.4 |
| MgO/CaO (Molar fraction) | 0.25 | 0.67 | 0.67 | 0.67 | 0.67 | 0.5 | 4.2 | 3.3 | 3.3 |
| Liquidus temperature (° C.) | 1168 | 1131 | 1144 | 1128 | 1159 | 1224< | 1217< | 1201 | 1208 |
| Average thermal expansion coefficient ($\times 10^{-7}$/° C.) | 70 | 66 | 65 | 69 | 71 | 62 | 61 | 64 | 61 |
| Tg (° C.) | 667 | 666 | 658 | 658 | 665 | 676 | 684 | 674 | 691 |
| Strain point (° C.) | (612) | (611) | (603) | (603) | (610) | (621) | (629) | (619) | (636) |
| Density (g/cm³) | 2.87 | 2.74 | 2.79 | 2.81 | 2.85 | 2.60 | 2.57 | 2.63 | 2.69 |

The bracketed strain points are values estimated from Tg.
Strain point = Glass transition point Tg − 55° C.
RO = MgO + CaO + SrO + BaO The liquidus temperature, average thermal expansion coefficient, glass transition point Tg, strain point and density of each glass sample were obtained by the methods described below.

The liquidus temperature was measured as follows. First, the glass sample was crushed and sieved with a 2830 μm sieve, and the glass particles that passed through the sieve were sieved with a 1000 μm sieve. 30 g of the glass particles remaining on this sieve was weighed out and spread onto a platinum boat with a width of 10 mm, a length of 200 mm and a depth of 10 mm. This was kept, for 2 hours, in a furnace in which a temperature is set to have a temperature gradient in the length direction of the boat. The platinum boat was taken out from the furnace and cooled naturally, and then the glass particles on the platinum boat were observed with a microscope at a magnification of 50. The highest temperature at which the glass particles were crystallized was defined as the liquidus temperature.

The average thermal expansion coefficient was measured as follows. First, a cylindrical glass sample with a diameter of 5 mm and a height of 18 mm was produced. This was heated from 25° C. to the yield point of the glass sample, and the elongation of the glass sample was measured at each temperature to calculate a thermal expansion coefficient. The average value of the thermal expansion coefficients in the temperature range of 50 to 350° C. was calculated. Thus, the average thermal expansion coefficient was obtained.

The glass transition point Tg was determined as follows. In a thermal expansion curve obtained from the above, the temperature at the intersection between the low temperature side of the expansion curve rising linearly from the room temperature and the expansion curve from the bent portion to the yield point is defined as the glass transition point Tg.

The strain point was measured as follows. First, a rectangular parallelepiped glass sample with a height of 3 mm, a width of 3 mm and a length of 50 mm was produced. This glass sample was fixed, at both ends of the longer side thereof, horizontally in the furnace. A load was applied to a central part of the longer side, and the rate at which the glass sample was bent was measured at each temperature. Based on this, the strain point was measured. The strain points of the glass samples other than Sample No.1 in Table 1 were estimated respectively as temperatures 55° C. lower than the glass transition points Tg determined by the above-mentioned method.

The density was measured by Archimedes method.

Samples No. 1 to 14 in Table 1 are the glass substrates according to the present invention. It has been found that these glass samples are suitable to be mass-produced by an existing float-process production apparatus because they have an average thermal expansion coefficient of $75\times10^{-7}/°$ C. or less (the samples except for Sample No. 14 have an average thermal expansion coefficient of $70\times10^{-7}/°$ C. or less) in the temperature range of 50 to 350° C., and a liquidus temperature of 1200° C. or lower (Samples No. 1, 2, 4 to 8, and 11 to 13 have a liquidus temperature of 1150° C. or lower, and Samples No. 1 and 2 have a liquidus temperature of 1100° C. or lower). These glass samples have a strain point that surely exceeds 500° C. because they have a glass transition point Tg of 600° C. or higher, more specifically 650° C. or higher.

Furthermore, the glass substrates No. 1 to 5, 7 to 9, and 11 to 13 are convenient to handle in the case of being produced with a large area because have a density of less than 2.83 g/cm$^3$, specifically 2.82 g/cm$^3$ or less (Samples No. 1, 3 to 5, 7, 8, 11 and 12 have a density of 2.80 g/cm$^3$ or less).

Samples No. 15 to 18 in Table 1 are Comparative Examples and have a liquidus temperature exceeding 1200° C.

Figure 2:
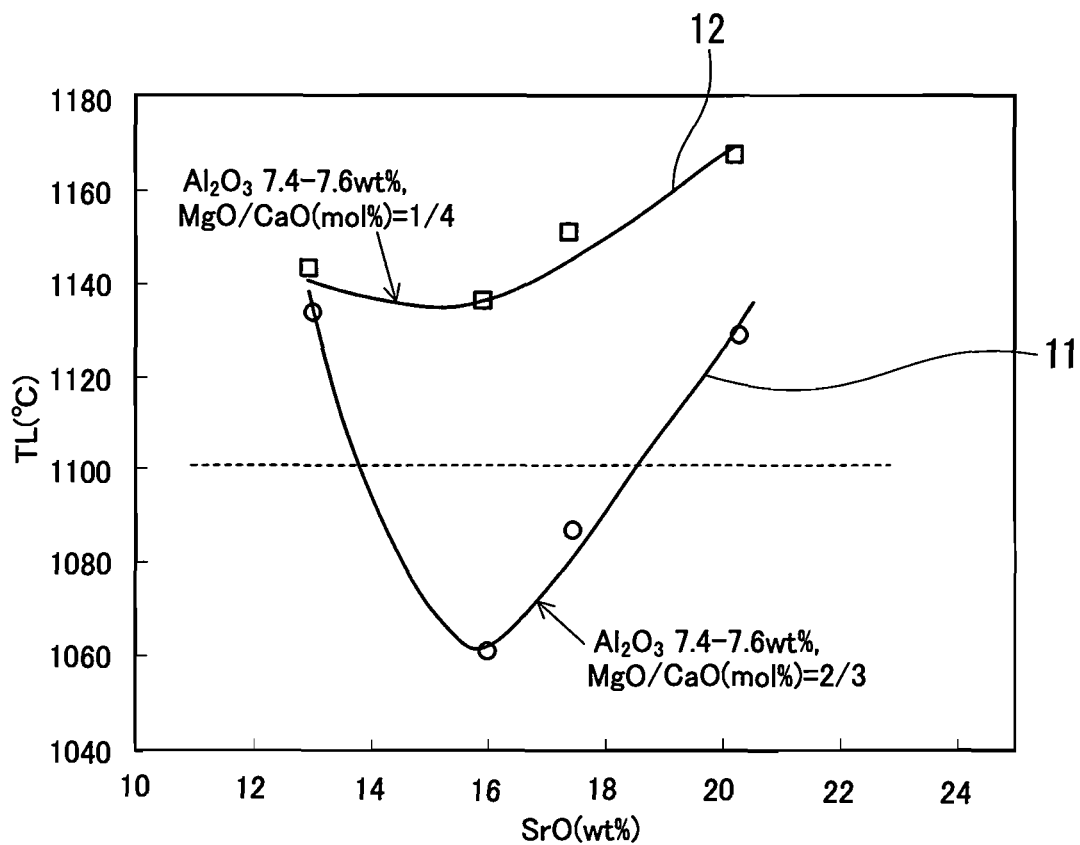
FIG. 2 is a diagram showing a relationship between the content of SrO and a liquidus temperature TL with regard to the grass substrate according to the present invention.

FIG. 2 is a diagram showing a relationship between the content of SrO and a liquidus temperature TL with regard to the grass substrates produced above. Here, the glass substrates having a composition in which the content of $Al_2O_3$ was 7.4 to 7.6% and the value of MgO/CaO was 0.25 or 0.67 in molar fraction were selected. On both of an approximated curve 11 of the glass substrates in which the value of MgO/CaO was 0.67 and an approximated curve 12 of the glass substrates in which the value of MgO/CaO was 0.25, the liquidus temperature was lowest around a point where the content of SrO was about 16%. In each glass substrate on the approximated curve 11, the value of MgO/CaO fell in the range of 0.3 or more to 0.8 or less, and the liquidus temperature was lower than those of the glass substrates on the approximated curve 12. Each glass substrate on the approximated curve 11 had a liquidus temperature of about 1100° C. or lower when the content of SrO was in the range of 14 to 18%.

INDUSTRIAL APPLICABILITY

The glass substrate according to the present invention is applicable not only as a glass substrate for a compound semiconductor solar cell but also as, for example, a glass substrate for an amorphous solar cell and cover glass for a crystalline silicon solar cell. The glass substrate according to the present invention can be used also as a glass substrate for a tandem solar cell. Moreover, the glass substrate according to the present invention can be used also as a glass substrate for a display such as a field emission display (FED) and a plasma display panel (PDP).

The invention claimed is:

1. A glass substrate comprising, in terms of mass %:
   59.7 or more but 66% or less of $SiO_2$;
   2.5 to 9.9% of $Al_2O_3$;
   0 to 2.5% of $Li_2O$;
   3% or more but less than 5% of $Na_2O$;
   0% or more but less than 6% of $K_2O$;
   more than 0% but 5.2% or less of MgO;
   more than 3% but 13% or less of CaO;
   more than 15% but 18% or less of SrO;
   0 to 3% of $TiO_2$; and
   0 to 9.8% of $ZrO_2$,
   wherein a value of $SiO_2+Al_2O_3$ is 73% or less,
   a value of $Li_2O+Na_2O+K_2O$ is less than 6%,
   a value of MgO+CaO is more than 3% but 16% or less,
   a value of SrO+BaO is more than 15% but 18% or less,
   a value of MgO+CaO+SrO+BaO is 21 to 33%,
   a value of MgO/CaO is 0.2 or more but 1.0 or less in molar fraction,
   the glass substrate is substantially free from $B_2O_3$,
   the glass substrate is substantially free from BaO
   the glass substrate has a glass transition point higher than 555° C.,
   the glass substrate has a liquidus temperature of 1200° C. or lower, and
   the glass substrate has an average thermal expansion coefficient of $70\times10^{-7}/°$ C. or less in a temperature range of 50 to 350° C.

2. The glass substrate according to claim 1, wherein the liquidus temperature is 1150° C. or lower.

3. The glass substrate according to claim 1, having a density of less than 2.83 g/cm$^3$.

4. The glass substrate according to claim 3, wherein the density is 2.80 g/cm$^3$ or less.

5. The glass substrate according to claim 1, comprising, in terms of mass %:
   4. 8 to 9.9% of $Al_2O_3$,
   3% or more but less than 5% of $Na_2O$; and
   0% or more but less than 2% of $K_2O$,
   wherein the value of $Li_2O+Na_2O+K_2O$ is less than 5%.

6. The glass substrate according to claim 1, wherein the value of MgO/CaO is 0.3 or more but 0.8 or less in molar fraction.

7. The glass substrate according to claim 1, wherein the liquidus temperature is 1100° C. or lower.

8. A glass substrate with a transparent conductive film, comprising:
   the glass substrate according to claim 1; and
   a transparent conductive film formed on the glass substrate.

9. A method for producing a glass substrate, comprising:
   melting a raw material; and
   forming the material into the glass substrate,
   wherein the glass substrate is as defined in claim 1, and the melting step and the forming step are conducted by a float process.

10. The glass substrate according to claim 1, wherein the glass substrate is substantially free from $K_2O$.

* * * * *